Dec. 21, 1965 J. STEENBERG 3,225,263

DIODE MATRIX

Filed Dec. 28, 1962 2 Sheets-Sheet 1

INVENTOR.
JOHANNES STEENBERG
BY
Frank R. Jifari
AGENT

Dec. 21, 1965 J. STEENBERG 3,225,263

DIODE MATRIX

Filed Dec. 28, 1962 2 Sheets-Sheet 2

INVENTOR
JOHANNES STEENBERG
BY

AGENT

United States Patent Office 3,225,263

Patented Dec. 21, 1965

3,225,263

DIODE MATRIX

Johannes Steenberg, Enschede, Netherlands, assignor to N.V. Hollandse Signaalapparaten, Hengelo, Overijsel, Netherlands, a firm of the Netherlands Filed Dec. 28, 1962, Ser. No. 247,999
Claims priority, application Netherlands, Jan. 2, 1962, 273,115
6 Claims. (Cl. 317—112)

The invention relates to a diode matrix with at least two sets of conductors, in which each of a number of conductors belonging to a first one of these sets is connected, by means of separate connecting devices, each of which comprises a rectifying element, with a number of conductors of a second one of the sets of conductors, a connecting device coupling two conductors connecting its rectifying element electrically between the conductors coupled by the device, the said matrix comprising a number of adjacently mounted isolating plates which carry the conductors and are provided with openings arranged so as to constitute a number of passages through these plates, in each of which passages a rod shaped connecting device can be inserted, which connecting device is provided with two contact pieces enclosing the device at least partly, and situated side by side, as seen in the longitudinal direction of the device, each of which contact pieces is connected to one of the two conductors leading to the rectifying element in the said connecting device, the contact pieces being situated at such a distance that, if the connecting device is inserted into one of the passages in positions situated within a certain range, one of the contact pieces is in contact with a conductor belonging to a first one of the sets whilst the other contact piece is in contact with a conductor belonging to another one of the sets of conductors.

Such diode matrices are multifariously applied in the electronic computer technique and in the electronic control technique. Apparatus applied in these techniques as a rule comprise large numbers of different components. For this reason it is important to build these components as small as possible, so that the size of the apparatus will nevertheless remain within reasonable limits. Furthermore, the intricacy of the circuits in this type of apparatus makes searching for defects difficult and expensive, so that the reliability of the electrical contact between the conductors of the matrix and the contact pieces of the connecting devices is very important. Moreover, in connection with the large number of components it is important for each of these components to be simple in construction and inexpensive. The known types of diode matrices with changeable setting do not satisfy these conditions sufficiently.

It is the objection of the invention to create a diode matrix which does satisfy the said conditions. According to the invention, for this purpose a matrix is built in such a way that the conductors consist of elastic metal bars or wires, each of which runs along a row or passages in such a way that they enter these passages sideways, the conductors of a set of conductors being enclosed between two successive plates destined for supporting the said set, the conductors being mounted in such a way between two successive passages either in grooves in or between projections of at least one of the said two plates, that a connecting device cannot enter a passage without causing a certain amount of elastic deformation in each conductor which runs along the said passage, whilst the grooves or projections are shaped so as to permit such deformations in the vicinity of the passages.

In the matrix according to the invention the shape of the conductors is very simple, such in contradistinction to the conductors of the known types of diode matrices. Consequently the dimensions of a matrix according to the invention, especially its thickness, can be substantially smaller than those of the known types of diode matrices, whilst, moreover, its cost of production is substantially lower. Furthermore the contact surface between the conductors and the contact pieces of the rod shaped connecting devices is much smaller than in the known matrix constructions. This results in high contact pressure and consequently in excellent and reliable electrical contact between the conductors and the contact pieces of the connecting devices, although no screw connections are applied.

In a very effective embodiment of a diode matrix according to the invention the conductors are elastic bars or elastic wires bent to a U-shape, one of the legs of this U being carried along the one side and the other leg of the U along the other side of a row of passages, so that a rod shaped connecting device which is put into a passage is enclosed between the two legs of the U-shaped conductor. This construction constitutes an excellent and stable support of the conductors in the matrix and promotes an excellent and reliable contact between the contact pieces on the rod shaped connecting devices and the conductors.

A very effective embodiment of a diode matrix according to the invention possesses three sets of conductors, each set enclosed between a pair of plates, the conductors of the outer sets being carried in a corresponding way along the passages, whilst the distance between the contact pieces on the rod-shaped connecting devices corresponds to the distance between the middle set of conductors and each of the outer sets, so that the rectifying element in such a rod-shaped connecting device, depending on from which side the connecting device is introduced into the matrix, is connected between a conductor of the middle set on the one hand and a conductor of either the one or the other outer set on the other hand.

A diode matrix of the latter type is of special importance for the purpose of applying a potential differing from the potential of rest to a certain conductor out of a set of conductors if a certain combination of binary signal potentials is applied to a certain combination of conductors of another set. For each binary bit to be applied to the matrix a matrix of this type possesses two conductors, one of which obtains a potential differing from the potential of rest if the said element is a 1-bit and the other one obtains a potential differing from the potential of rest if the said element is a 0-bit, so that the matrix receives the signal as well as its inversion. The conductor of the second set to which a potential differing from the potential of rest must be applied for a certain received signal is connected by means of diodes constituting an "and" circuit to those conductors of the other set to which potentials differing from the potential of rest are applied if the said signal is received. An output conductor in such a matrix is never at the same time connected by diodes to the conductor supplying the element as well as to the conductor supplying the inversion of the said element. Consequently the construction described above permits the dimensions of the matrix to be reduced. The conductors which supply the bits are divided into two groups. At one side of the plate between which the conductors to be selected are enclosed the conductors are situated which obtain a potential differing from the potential of rest if the received bit is a 1-bit, whilst the conductors to which a potential differing from the potential of rest is applied if the bit received is a 0-bit are situated at the other side of these plates. The same passage can then be used for a 0-bit as well as for a 1-bit. The matrix reacts either to a 1-bit or to a 0-bit, depending on from which side the rod-shaped connecting device is introduced into the matrix.

In a second embodiment of the invention suitable for the application described above the matrix possesses three sets of conductors, two sets of which are enclosed between the same pair of plates. These conductors are situated in such a way that a conductor belonging to one of these sets is carried along a row of openings at one side of these openings, whilst along the other side of these openings a conductor is carried belonging to the second one of these two sets, and the contact piece on a rod-shaped connecting device destined to co-operate with the conductors enclosed between this pair of plates at the point where the cooperation is effected, does not enclose the said rod-shaped connecting device completely, so that, depending upon the position of the rod-shaped connecting device in the passage, it either only contacts the conductor at the one side of the passage or only contacts the conductor at the other side of the passage.

In order to facilitate the introduction of the rod-shaped connecting devices into the matrix such a device is provided with a stop, situated in such a way that when this stop rests against the outer plate of the matrix at the side where the connecting device is introduced into a passage in the matrix, the contact pieces of this connecting device are able to contact the conductors passing along the said passage. If such a rod-shaped connecting device provided with a stop is introduced into the matrix, no special care need be taken in order to adjust it to the required position. In a matrix with three sets of conductors enclosed between three sets of plates the stop of the rod-shaped connecting device rests against the outer plate of the matrix at the side from which the connecting device is introduced into the matrix, as a result of which one of the contact pieces is in contact with a conductor of the middle set of conductors whilst the other contact piece is in contact with a conductor belonging to one of the outer sets of conductors.

The invention will now be elucidated by describing embodiments of the invention with reference to the figures.

Figure 2:
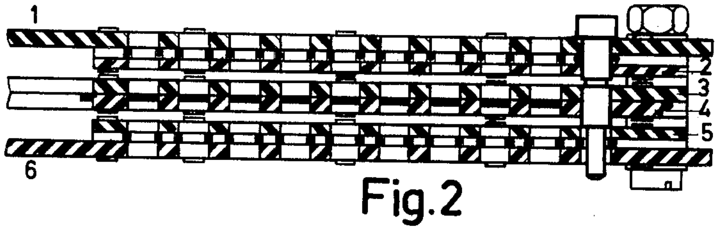
FIGURE 2 shows a cross section of the same matrix in a first direction.
Figure 3:
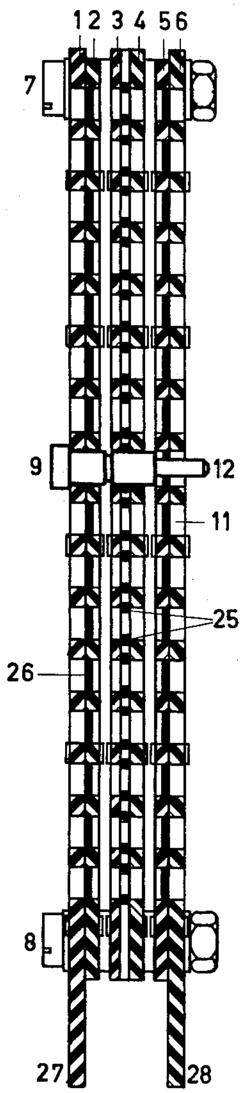
FIGURE 3 shows a cross section of the same matrix in a second direction.
Figure 4:
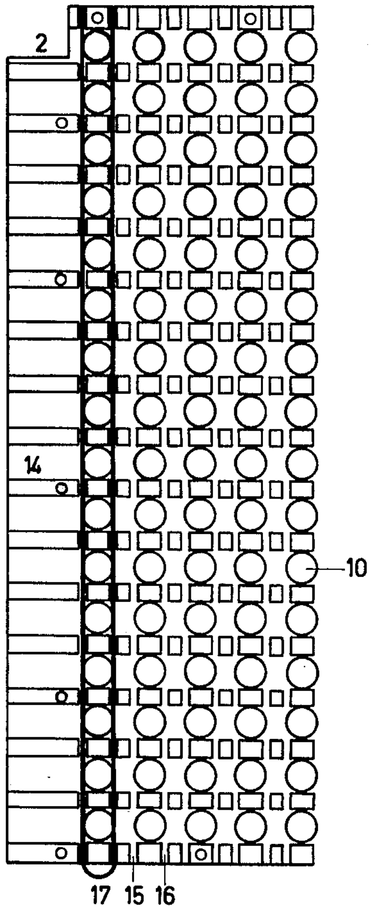
FIGURE 4 shows an example of the positions of the projections and grooves present on or in one of the plates and destined to support the conductors.

It may be derived from the FIGURES 2 and 3 that the matrix according to the first embodiment described comprises six parallel flat plates 1 to 6. The plates are arranged in pairs, so that the two plates of a pair rest against each other. The plates are joined by means of bolts, such as 7 and 8, whilst distance tubes determine the distance between the pairs of plates. All plates are provided with circular openings at corresponding points. The centres of these openings are situated on the intersection points of two sets of parallel, mutually perpendicular lines. These openings constitute passages such as 11 into which connecting devices such as 12, each of which comprises a diode, can be introduced. One plate of each pair of plates is provided with grooves and projections as can be seen in FIGURE 4 in the case of the plate 2. This figure shows in the first place the pattern of openings 10, which, together with the openings in the other plates, constitute the passages. Furthermore for each row of openings arranged horizontally in the figure a broad channel 14 is provided, the breadth of which is adapted to the diameter of the openings and the depth of which is adapted to the diameter of the conductors. In the projections between these channels grooves are present having a breadth which is adapted to the diameter of the elastic conductors so that the grooves are just able to contain such a conductor. For each row of openings arranged vertically in the figure such a projection possesses two short grooves. The distance between the centerlines of these grooves is in this case slightly smaller than the diameter of the openings. The short grooves in the successive projections constitute two straight grooves shown vertically in the drawing, one at each side of the line connecting the centres of a vertical row of openings. The grooves running along the outer left but one row of openings are designated by the references 15 and 16. In the grooves situated at either side of a row of openings two legs of a U-shaped conductor are contained which belong to one of the sets of conductors. The position of such a U-shaped conductor is shown in case of the outer left hand row of openings. This conductor is designated by 17. As may be derived from the cross sections shown in FIGURES 2 and 3 the plate 2 rests with the side in which the grooves and channels are present against the plate 1, so that the conductors contained in the grooves of plate 2 are enclosed between the plates 1 and 2. As may be seen in the case of the conductor 17 these conductors enter the passages constituted by each set of openings sideways. If a connecting device is introduced into such an opening the said conductors are pressed aside. The channels 14 permit such a movement, but owing to the presence of the remaining projections between the channels constituting the walls of the grooves, this movement cannot take place without such a conductor exerting a substantial elastic force on the connecting device in the opening. As will be shown below this force is exerted on a contact piece of the connecting device so that in any case an excellent electrical contact will result.

Figures 5, 6:
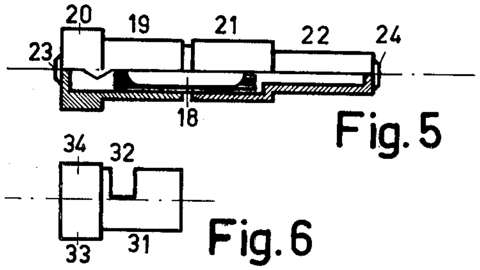
FIGURE 5 shows a connecting device with a rectifying element of one simple diode, the device being shown partly in cross section, partly in front view.
FIGURE 6 shows a contact piece for such a connecting device.

FIGURE 3, reference 9, designates a connecting device with a diode situated in the matrix. FIGURE 5 shows such a connecting element in greater detail. In this figure reference 18 designates the diode. Two brass fittings 21 and 19 are glued to this diode. At the points designated by 23 and 24 the conductors connected to the diode are soldered to the fittings. Consequently the diode is connected electrically between the two fittings. The fittings constitute the contact pieces of the connecting device. The fitting 19 comprises a rim 20 constituting the stop for the connecting device. If the connecting device is introduced so far into the matrix that this stop 20 rests against an outer plate of the matrix, then the fitting 19 is in contact with an elastic conductor behind the plate against which the stop rests, whilst the part with the largest diameter of the fitting 21 is in contact with the elastic conductor belonging to a second set of conductors. The connecting device shown is destined to be used in a matrix with three sets of conductors arranged side by side. In connection therewith the fitting 21 is provided with an extension piece 22 of smaller diameter. This is desirable for various reasons. The soldering connections in the conductors connected to the diode must have a certain minimum distance from the point where these conductors leave the envelope of the diode, because otherwise the diode will be damaged as a result of the soldering operation. Consequently the connecting device must have at least a certain length. Furthermore it is important that a connecting device situated in a matrix with three sets of conductors and resting with its stop against one of the outer plates should nevertheless protrude from the matrix at the end opposite to the stop. This facilitates the removal of the connecting device from the matrix. The extension piece 22, however, cannot have the same diameter as the part 21, which is to establish an electrical contact with a conductor of the middle set of conductors. Should the extension piece have the same diameter as the remaining part of the fitting, then it would also establish contact with a conductor of the second outer set of conductors, in this way directly connecting one of the conductors of one of the outer sets with a conductor of the middle set. For this reason the diameter of the extension piece 22 is so much smaller than the diameter of the part 21 of the fitting that, when the connecting device is in the matrix, the extension piece is unable to establish a contact with the second one of the outer sets of conductors enclosed between the plates situated at the side away from the plate against which the stop rests. If such a connecting device is introduced from the right hand side into a passage of the matrix shown in cross section in FIGURE 3 then the part 19 establishes an electrical contact with the two legs of a U-shaped conductor belonging to the set of conductors enclosed between the plates 5 and 6, whilst the part 21 establishes contact with the two legs of a U-shaped conductor enclosed between the plates 3 and 4. The diode in the connecting device is then connected between a conductor of the right hand set and a conductor of the middle set. If, on the contrary, the connecting device is introduced into the matrix from the left hand side, then the part 21 of the fitting will nevertheless establish contact with a conductor of the middle set, but the part 19 will establish contact with the two legs of a U-shaped conductor enclosed between the plates 1 and 2. The diode is then connected between a conductor of the left hand set of conductors and a conductor belonging to the middle set of conductors. In FIGURE 3 the conductors of the various sets are shown. The conductors belonging to the middle set are perpendicular to the plane of the drawing and the circular cross sections of these U-shaped conductors are designated by 25. The conductors of the two outer sets are parallel to the plane of the drawing and one of these conductors is designated by the reference 26.

In a very effective embodiment of a matrix according to the invention with three sets of conductors the two outer plates 1 and 6 constitute two successive plates of the type used in computers for the purpose of carrying certain parts of the circuit of these computers and which are arranged to be mounted in straight contact sockets with elastic contacts. For this purpose the outer plates are provided with protruding parts 27 and 28 (FIGURES 1 and 3) which are adapted to such contact sockets and on which contacts 29 are arranged by means of the printed circuit technique. When the plate is in the said straight socket these contacts co-operate with the contact springs of such a straight socket in order to establish the connections between the various parts of the matrix and the various parts of the circuit in the machine using this matrix. In an effective embodiment the matrix does not completely fill the space between the plates and the remaining part of this space contains various circuit elements co-operating with and fixedly connected to the matrix, such as, for instance, the various resistances, to be connected to the conductors of the middle set for the purpose of arranging "and" circuits or "or" circuits by means of the diodes in the connecting devices introduced into the passages of the matrix. Furthermore the said space is capable of containing the common collector amplifiers inserted in the output circuits of the middle set of conductors in order to make the input impedance of the matrix independent from the loads on the output circuits.

Figure 1:
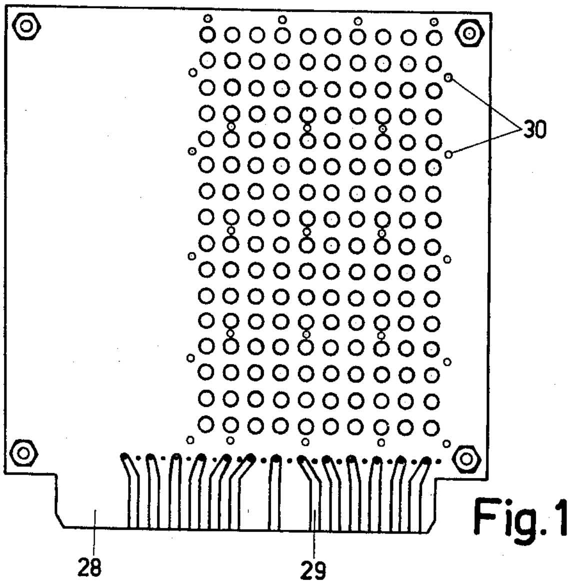
FIGURE 1 shows a front view of a matrix according to the invention.

The two plates of a pair are connected by means of hollow rivets, two of which designated by 30, are shown in FIGURE 1. These rivets must be distributed in such a way over the plates, that, when a connecting device is introduced into the matrix, these plates will not be bent so far that the conductors can leave the grooves. As has been shown in the figure in the embodiment described the distance between such rivets is not larger than four times the distance between the centres of two passages in the matrix.

If the matrix possesses only two sets of conductors only two pairs of plates need be present in the matrix, such as, for instance, the pairs 1, 2 and 3, 4, the pairs 5, 6 being absent in this case. Between each pair of plates one of the two sets of conductors is enclosed. A similar construction with two pairs of plates can also be used if the matrix possesses three sets of conductors. In this case two of these sets must be enclosed between the same pair of plates. In a simple embodiment of such a matrix the number of rows of openings is equal to the sum of the numbers of conductors in the two sets enclosed between the said pair of plates. But should it never be necessary, as in the embodiment described above for a conductor of the set enclosed between the other pair of plates to be connected simultaneously to two corresponding conductors of the two sets enclosed between the same plate, then a construction requiring less space can be applied. In this construction a conductor belonging to one of the two sets enclosed between the same pair passes along the one side of each row of passages, whilst the corresponding conductor belonging to the second set enclosed between the same pair passes along the other side of a row of passages.

In FIGURE 6 reference 31 designates a fitting for a connecting device used in this type of matrix, in which two sets of conductors are enclosed between the same pair of plates. At the point where this fitting is to establish a contact with one of the conductors enclosed between the pair of plates supporting two sets of conductors and against which the stop 32 rests, a recess covering about half of the circumference of the fitting is present. By rotating the connecting device in a passage of the matrix the said fitting will either establish contact with the conductor situated at the one side of the passage, or establish contact with the conductor at the other side of the said passage. In order to indicate with which of the two conductors carried along a passage the diode in the connecting device co-operates some type of indicator must be present on the fitting. In the embodiment shown, the rim 33 constituting the stop, is provided with a flat part 34 at the side where the recess is present. Obviously other types of indicators can be used. It may be necessary in a connecting element of this type to bevel, chamfer or round off the recess in the fitting in order to prevent the connecting device from being locked by the conductor which enters the recess. Whether this is necessary is determined by how far the conductors enter the recess and by the diameter of this conductor. It is obvious that the recess can also be in the fitting which is not provided with the stop, and in this case the two sets of conductors enclosed between the same pair of plates must be enclosed between the pair away from the plate against which the stop is to rest.

It is obvious that the application of the invention is not restricted to the embodiments described. It is, for instance, not necessary for the presence of the grooves and the channels which serve to contain the conductors to be restricted to one of the two plates of a pair only. In an effective embodiment, grooves and channels adapted to half of the diameter of the conductors are present in both plates of a pair. This embodiment is especially important if the plates are fabricated by moulding or pressing, because in this case all plates can be pressed or moulded by means of the same die. Furthermore the space in which the conductors can move out of the passages can be provided in another way than by means of the channels 14. If the grooves in which the conductors are enclosed are only present in one of the plates of a pair of plates, then, in order to permit the motion of the conductors, the openings in this plate can have larger dimensions than the openings in the other plate. In this case, in order to prevent the projections between which the conductors are enclosed from becoming too small, the enlarged openings can be given a longitudinal shape with its largest dimensions transverse to the grooves. Moreover, instead of a channel 14, a recess can be made around each opening, preferably with its largest dimension transverse to the direction of the conductors, in which recess the conductors are able to move aside. The embodiment shown in the figures is especially suitable if the matrix is to be fabricated in small batches and, consequently the plates are not fabricated by moulding or pressing. The straight channels shown in the figure can then be obtained by milling. If the plate is fabricated by pressing or moulding the construction is subject to a smaller number of restrictions. Furthermore it is possible to combine certain plates. In the matrix according to FIGURE 3, for instance, four plates will suffice if the plates 2 and 3 and also the plates 4 and 5 are combined into one plate. This leads to a more rigid construction but has the disadvantage that the length of the leakage current routes will become smaller. Furthermore it is not necessary for the rows of openings along which the conductors are carried to be straight. Neither is it necessary for the conductor carried along a straight row of openings to be straight. A zig-zag-shaped conductor carried along a straight row of openings may show certain advantages because the conductors will to a certain extent enclose the connecting devices.

What we claim is:

1. A matrix circuit board comprising, a first planar electrically insulating support member having a plurality of groups of apertures therethrough, a first set of conductors supported by said first planar member and arranged thereon so that each conductor is in partial registration with each aperture of one group of apertures only, a second set of conductors supported by said first planar member and arranged thereon so that each conductor is spaced from and electrically insulated from the conductors of the first set and each is in partial registration with each aperture of one group of apertures only, a second planar support member identical with said first planar support member, means joining said first and second planar support members in spaced registration so that the corresponding apertures are in alignment, a third set of conductors supported by said second planar support member and arranged thereon so that each conductor is in partial registration with each aperture of one group only, and circuit means inserted in at least one pair of aligned apertures in the first and second planar support members for selectively electrically connecting one only of the first and second sets of conductors in partial registration with the selected apertures in the first planar support member with the third set conductor in partial registration with the corresponding aligned aperture in the second planar support member.

2. The matrix set forth in claim 1 in which said circuit means is a diode.

3. The matrix set forth in claim 1 in which said circuit means generally has a cross-sectional area substantially the same shape as the apertures and includes a relieved portion to provide an electrically insulating clearance for one of the two conductors in registration with an aperture when inserted therein.

4. The matrix set forth in claim 3 in which said circuit means is a diode.

5. The matrix set forth in claim 3 in which said circuit means includes a visible indicia to locate the relieved portion and the first and second sets of conductors associated with any given aperture are in partial registration with the opposite sides of the aperture whereby motion of the circuit means by 180 degrees changes the electrical connection from the first set to the second set.

6. The matrix set forth in claim 5 in which said circuit means is a diode.

References Cited by the Examiner

UNITED STATES PATENTS

| | | | |
|---|---|---|---|
| 840,537 | 1/1907 | Weir | 317—112 |
| 872,670 | 12/1907 | McWilliams | 339—18 |
| 2,990,499 | 6/1961 | Cordes | 339—18 |
| 3,021,498 | 2/1962 | Spillar | 339—18 |
| 3,151,923 | 10/1964 | Bell | 339—18 |

JOHN F. BURNS, *Primary Examiner.*